United States Patent
Pliquett et al.

(10) Patent No.: US 7,778,359 B2
(45) Date of Patent: Aug. 17, 2010

(54) METHOD AND DEVICE FOR CLOCK SYNCHRONISATION WITH A VESTIGIAL-SIDEBAND-MODULATED TRANSMITTED SIGNAL

(75) Inventors: Jochen Pliquett, Munich (DE); Thomas Reichert, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 1252 days.

(21) Appl. No.: 11/302,320

(22) Filed: Dec. 13, 2005

(65) Prior Publication Data

US 2006/0208786 A1  Sep. 21, 2006
US 2007/0222495 A2  Sep. 27, 2007

(30) Foreign Application Priority Data

Dec. 13, 2004  (DE) ............... 10 2004 059 956

(51) Int. Cl.
*H03D 1/24* (2006.01)
(52) U.S. Cl. .............. 375/321; 375/262; 375/326; 375/355; 375/324; 348/725
(58) Field of Classification Search .......... 375/262, 375/326, 355, 324; 348/725
See application file for complete search history.

(56) References Cited

U.S. PATENT DOCUMENTS

| | | | |
|---|---|---|---|
| 4,338,579 A | * | 7/1982 | Rhodes .................. 332/100 |
| 5,832,046 A | | 11/1998 | Li et al. |
| 5,870,443 A | * | 2/1999 | Rahnema .................. 375/355 |
| 5,894,334 A | * | 4/1999 | Strolle et al. ................. 348/725 |
| 6,411,659 B1 | * | 6/2002 | Liu et al. .................... 375/326 |
| 6,842,495 B1 | * | 1/2005 | Jaffe et al. ................... 375/326 |
| 2001/0031022 A1 | * | 10/2001 | Petrus et al. ................. 375/324 |
| 2007/0263742 A1 | * | 11/2007 | Schmidt ..................... 375/262 |

FOREIGN PATENT DOCUMENTS

WO  WO 99/21323  4/1999
WO  WO 99/60746  11/1999

* cited by examiner

*Primary Examiner*—Sudhanshu C Pathak
(74) *Attorney, Agent, or Firm*—Ditthavong Mori & Steiner, P.C.

(57) ABSTRACT

A method for clock synchronisation between an amplitude-modulated or phase-modulated received signal (r(t)) and a transmitted signal (s(t)) estimates the timing offset ($\epsilon$) between the received signal (r(t)) and the transmitted signal (s(t)) by means of a maximum-likelihood method. The maximum-likelihood method in this context is realised by an estimation filtering (S40; S140) dependent upon the transmission characteristic, a subsequent nonlinear signal-processing function (S50; S150) and an averaging filtering (S60, S100; S180, S200). The received signal (r(t)) is especially a modified vestigial-sideband-modulated received signal ($r_{VSB}'(t)$). The nonlinear signal-processing function (S50; S150) maintains the alternating component in the spectrum of the pre-filtered vestigial-sideband-modulated received signal ($v_{VSB}'(t)$).

26 Claims, 6 Drawing Sheets

METHOD AND DEVICE FOR CLOCK SYNCHRONISATION WITH A VESTIGIAL-SIDEBAND-MODULATED TRANSMITTED SIGNAL

The invention relates to a method and a device for clock synchronisation with a vestigial-sideband-modulated transmitted signal (VSB).

When transmitters and receivers are synchronised with one another within a transmission system, a transmitter-end and receiver-end adaptation of the clock signal and the carrier signal is implemented respectively with regard to the phase position and frequency. The clock synchronisation considered in the following paragraphs requires a clock recovery in the receiver, which can be realised with or without feedback.

In the case of a clock recovery with feedback, the clock phase and clock frequency is estimated on the basis of the received signal, and a frequency oscillator is re-tuned for phase-synchronous and frequency-synchronous sampling of the received signal at the correct inter-symbol, interference-free decision timings.

By contrast, in the case of clock recovery without feedback, the clock phase and clock frequency are estimated on the basis of the received signal sampled at a fixed sampling frequency, and the symbol value of the received signal, which is correct at the respective decision timing, is determined via an interpolator from the sampled values, which are adjacent at the respective inter-symbol-interference-free decision timings.

Regarding a clock recovery without feedback with a clock frequency, which is fixed and known to the receiver, a method based on the maximum-likelihood estimation for pulse-amplitude-modulated (PAM), quadrature-phase-modulated (QPSK) and $\pi/4$-quadrature-phase-modulated ($\pi/4$-QPSK) signals is already known from [1]: K. Schmidt: "Digital clock recovery for bandwidth-efficient mobile telephone systems" [Digitale Taktrückgewinnung für bandbreiteneffiziente Mobilfunksysteme], 1994, ISBN 3-18-14 7510-6.

The maximum-likelihood estimation in this context is based on maximising the likelihood function, which minimises the square of the modulus error between a measured, noise-laden received signal and a modelled, ideally noise-free transmitted signal containing the sought timing offset over an observation period via an inverse exponential function. The sought timing offset is derived, when the modelled, transmitted signal approximates the measured, received signal with minimum modulus error squared.

As described in [1] and shown in greater detail below, the likelihood function is obtained from the received signal convoluted with the impulse response of a signal-adapted pre-filter, which is subjected, after pre-filtering, to a nonlinear function and then averaged over a limited number of symbols. As also demonstrated in [1], the nonlinear function can also be approximated by a modulus squaring. If the timing offset is determined in the time domain, the sought timing offset is derived from a maximum detection of the pre-filtered, modulus-squared and averaged received signal according to the maximum-likelihood function.

The disadvantage of an inaccurate and/or ambiguous maximum detection in the time domain, which results from inadequate removal of interference in the useful signal, can be avoided by an observation in the frequency domain. In the case of a determination of the timing offset in the frequency domain, the fact is exploited that the pre-filtered, modulus-squared received signal averaged over a limited number of symbols provides a basic periodicity over the symbol length and, respectively, with multiples of the symbol length, provides a maximum. Accordingly, after a discrete Fourier transformation of the pre-filtered, modulus-squared received signal averaged over a given number of symbols, the timing offset can be determined from the phase of the spectral line at the basic spectral frequency determined by the symbol frequency.

As will be shown in detail below, the frequency-domain-orientated determination of the timing offset outlined above fails with a vestigial-sideband-modulated received signal, because the VSB received signal provides no periodicity and no corresponding spectral lines, which are necessary for determining the timing offset in the frequency domain.

The invention is therefore based on the object of providing a method and a device for determining the timing offset in the frequency domain for the clock synchronisation of a vestigial-sideband-modulated (VSB) signal.

The object of the invention is achieved by a method for clock synchronisation with a vestigial-sideband-modulated (VSB) signal with the features of claim 1 and by a device for clock synchronisation with a vestigial-sideband-modulated (VSB) signal with the features according to claim 16. Advantageous further developments of the invention are specified in the dependent claims.

According to the invention, the symbol duration of the VSB signal is designed with one half of the symbol duration of a PAM, QPSK or $\pi/4$-QPSK signal. The invention also provides a down mixing of a VSB baseband received signal of this kind in order to form a modified VSB baseband received signal, which has identical signal behaviour to an offset QPSK signal.

Finally, instead of a modulus squaring, as in the case of a PAM, QPSK or $\pi/4$-QPSK signal, a squaring without modulus formation is implemented according to the invention as a nonlinear signal-processing function. The alternating components of the in-phase and the quadrature components of the pre-filtered, vestigial-sideband-modulated (VSB) baseband received signal are therefore constructively superimposed and lead to spectral lines, which can be identified by the subsequent, discrete Fourier transformation and supplied for subsequent spectral processing in order to determine the timing offset.

According to the invention, the discrete Fourier transformation of the pre-filtered, squared VSB baseband received signal, which has been averaged over a given number of symbols, is evaluated only at the positive and negative symbol frequency. Spectral lines of a higher value occurring periodically at the symbol frequency need not be taken into consideration, because no other harmonics are present in a Nyquist system with nonlinearity.

The carrier-frequency synchronisation, which is to be implemented on the received signal alongside the clock synchronisation, can be provided in cascade before or after the clock synchronisation. If the carrier frequency synchronisation according to the invention is carried out after the clock synchronisation, the pre-filtered, squared received signal, averaged over a given number of symbols, must be compensated by comparison with any carrier frequency offset and carrier phase offset, which may occur in the received signal, in order to achieve a correct determination of the timing offset of the clock pulse. With a positive symbol frequency, the Fourier transform of the received signal is therefore conjugated and then multiplied by the Fourier transform of the negative symbol frequency.

In an operational case affected by a carrier-frequency offset, since the spectral lines for a received signal free from a carrier-frequency offset coming to be disposed at the positive and negative symbol frequency are frequency-displaced at the positive or respectively negative symbol frequency by the carrier-frequency offset, the averaging filtering must be divided into a first averaging filtering with a second averaging filtering following the first averaging filtering. The throughput range of the first averaging filtering in this context should be designed so that the spectral line, frequency-displaced by the carrier-frequency offset relative to the positive or respectively negative symbol frequency, is registered by the first averaging filtering. The mid-frequencies of the first averaging filtering, realised as a Dirac comb in the time domain and correspondingly in the frequency domain as periodically-repeated Si functions, are therefore disposed respectively at multiples of the symbol frequency and provide a bandwidth, which corresponds to the maximum carrier-frequency offset to be anticipated. The large averaging length required for an optimum averaging of the pre-filtered and squared VSB baseband received signal, which accordingly determines a narrow-band averaging filtering and is therefore opposed to the bandwidth-expanded, first averaging filtering, is realised by the second averaging filtering, of which the averaging length is a multiple of the averaging length of the first averaging filtering and is therefore designed to have a substantially narrower band than the first averaging filtering.

In a first embodiment of the method according to the invention for clock synchronisation with a vestigial-sideband-modulated (VSB) signal and of the device according to the invention for clock synchronisation with a vestigial-sideband-modulated (VSB) signal, the first averaging filtering is implemented after the squaring, while the second averaging filtering takes place after the discrete Fourier transformation and conjugation or respectively multiplication of the Fourier transforms localised at the positive and negative symbol frequency, which follow the first averaging filtering.

In a second embodiment of the method according to the invention for clock synchronisation with a vestigial-sideband-modulated (VSB) signal and of the device according to the invention for clock synchronisation with a vestigial-sideband-modulated (VSB) signal, the first averaging filtering is implemented in each case following the discrete Fourier transformation or respectively conjugation and the second averaging filtering, after the multiplication of the two Fourier transforms averaged respectively with the first averaging filtering and localised at the positive or respectively negative symbol frequency.

The estimation filtering achieves a minimising of the data-dependent jitter in the VSB baseband received signal.

Finally, if the sideband of the VSB baseband received signal is disposed in the inverted position, the down mixing of the VSB baseband received signal is preceded by a mirroring of the sideband of the VSB baseband received signal from its inverted position into its normal position.

The two embodiments of the method according to the invention for clock synchronisation of the vestigial-sideband-modulated (VSB) signal and the device according to the invention for clock synchronisation of the vestigial-sideband-modulated (VSB) signal, are explained in greater detail below with reference to the drawings. The drawings are as follows.

Before describing the two embodiments of the method according to the invention and the device according to the invention for clock synchronisation with a VSB signal in greater detail with reference to FIGS. 5 to 10 of the drawings, the following section presents a derivation of the necessary mathematical background.

In a first stage, clock synchronisation with a QPSK signal using maximum-likelihood estimation is described as the prior art, so that the knowledge obtained can be transferred as an inventive step to clock synchronisation with a VSB signal.

Figure 1:
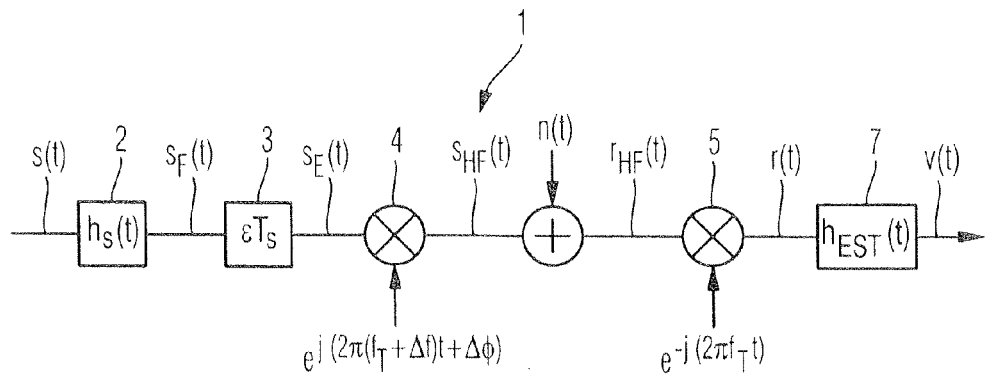
FIG. 1 shows an expanded block circuit diagram of the transmission system.

The starting point is a complex baseband model of a transmission system for time-continuous complex signals, of which the expanded block circuit diagram is shown in FIG. 1.

The complex symbol sequence s(t) of a PAM, QPSK or π/4 QPSK signal to be transmitted as shown in equation (1) is connected to the input of the transmission system 1:

$$s(t) = \sum_{n=-\infty}^{+\infty} a_R(n) \cdot \delta(t - nT_S) + j \cdot \sum_{n=-\infty}^{+\infty} a_I(n) \cdot \delta(t - nT_S) \quad (1)$$

In this context, $a_R(n)$ and $a_I(n)$ represent symbol values for the in-phase and quadrature components of the PAM, QPSK or π/4 QPSK transmitted signal to be generated, which can assume, for example, the real values $\{\pm s_i\}$ of the symbol alphabet. The symbol sequences of the in-phase and quadrature components respectively are periodic with regard to the symbol length $T_s$. In terms of system theory, the symbol sequence s(t) to be transmitted is convoluted in the transmitter filter 2 with its impulse response $h_s(t)$ and supplies the filtered symbol sequence $s_F(t)$ at the output of the transmitter filter 2 according to equation (2):

$$s_F(t) = \sum_{n=-\infty}^{+\infty} a_R(n) \cdot h_S(t - nT_S) + j \cdot \sum_{n=-\infty}^{+\infty} a_I(n) \cdot h_S(t - nT_S) \quad (2)$$

The subsequent lag element 3 models the timing offset ε·T occurring as a result of absent or inadequate synchronisation between the transmitter and receiver, which is derived from a timing offset ε to be determined by the method according to the invention or the device according to the invention. The timing offset ε in this context can assume positive and negative values, typically between ±0.5. Taking into consideration the timing offset ε·T at the output of the lag element 3, the filtered symbol sequence $s_\epsilon(t)$ is therefore derived according to equation (3):

$$s_\varepsilon(t) = \sum_{n=-\infty}^{+\infty} a_R(n) \cdot h_S(t - \varepsilon T_S - nT_S) + \qquad (3)$$

$$j \cdot \sum_{n=-\infty}^{+\infty} a_I(n) \cdot h_S(t - \varepsilon T_S - nT_S)$$

In a quadrature modulator, which is modelled as the multiplier 4 in FIG. 1, the lag-laden, filtered symbol sequence $s_\varepsilon(t)$ is mixed with a complex carrier signal $e^{j(2\pi(f_T+\Delta f)t+\Delta\phi)}$ to form a PAM, QPSK or π/4 QPSK modulated transmitted signal $s_{HF}(t)$. The carrier signal $e^{j(2\pi(f_T+\Delta f)t+\Delta\phi)}$ has a carrier frequency $f_T$, which provides a frequency offset $\Delta f$ and phase offset $\Delta\phi$ as a result of defective carrier-frequency synchronisation. Without taking into consideration signal errors of the quadrature modulator—for example, crosstalk of the carrier signal in the in-phase or quadrature channel, gain imbalance between the in-phase and quadrature channel, quadrature errors between in-phase and the quadrature channel—the mathematical context for the PAM, QPSK or π/4 QPSK modulated transmitted signal $s_{HF}(t)$ presented in equation (4) is derived:

$$s_{HF}(t) = \left[\sum_{n=-\infty}^{+\infty} a_R(n) \cdot h_S(t - \varepsilon T_S - nT_S) + j \cdot \right. \qquad (4)$$

$$\left. \sum_{n=-\infty}^{+\infty} a_I(n) \cdot h_S(t - \varepsilon T_S - nT_S)\right] \cdot e^{j(2\pi(f_T+\Delta f)t+\Delta\varphi)}$$

On the transmission path between the transmitter and the receiver, an additive white Gaussian noise (AWGN) n(t) is additively superimposed on the PAM, QPSK or π/4 QPSK modulated transmitted signal $s_{HF}(t)$, which provides a real and imaginary component $N_R(t)$ and $n_I(t)$ as shown in equation (5):

$$n(t) = n_R(t) + j \cdot n_I(t) \qquad (5)$$

The received signal $r_{HF}(t)$ arriving at the receiver accordingly results from equation (6):

$$r_{HF}(t) = s_{HF}(t) + n(t) \qquad (6)$$

In the receiver, the PAM, QPSK or π/4 QPSK modulated received signal $r_{HF}(t)$ with superimposed noise n(t) is mixed down into the baseband with the carrier signal $e^{-j2\pi f_T t}$ in a demodulator, which is modelled as the multiplier 5 in FIG. 1. The de-modulated received signal r(t) at the output of the demodulator 5, which contains an in-phase and quadrature symbol sequence distorted with the frequency offset and phase offset of the carrier signal, is therefore derived according to equation (7):

$$r(t) = s_\varepsilon(t) \cdot e^{j2\pi\Delta f t+\Delta\varphi} + n(t) \qquad (7)$$

$$= \left[\sum_{n=-\infty}^{+\infty} a_R(n) \cdot h_S(t - \varepsilon T_S - nT_S) + j \cdot \right.$$

$$\left. \sum_{n=-\infty}^{+\infty} a_I(n) \cdot h_S(t - \varepsilon T_S - nT_S)\right] \cdot e^{j(2\pi\Delta f t+\Delta\varphi)} + n(t)$$

Figure 2:
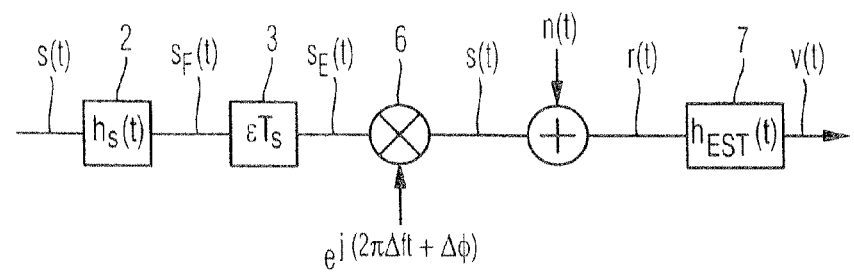
FIG. 2 shows a reduced block circuit diagram of the transmission system.

As can be seen from the equation (7), some of the system-theoretical effects of the modulator 4 and the demodulator 5 of the transmission system 1 on the PAM, QPSK or π/4 QPSK modulated signal are cancelled, so that the modulator 4 and the demodulator 5 in FIG. 1 can be replaced by a single multiplier 6, as shown in the reduced block circuit diagram in FIG. 2, which mixes the lag-laden, filtered symbol sequence $s_\varepsilon(t)$ with a signal $e^{j(2\pi(f_T+\Delta f)t+\Delta\phi)}$ according to equation (8) to form a transmitted signal $s_{NF}(t)$ in the baseband.

$$s_{NF}(t) = \left[\sum_{n=-\infty}^{+\infty} a_R(n) \cdot h_S(t - \varepsilon T_S - nT_S) + j \cdot \right. \qquad (8)$$

$$\left. \sum_{n=-\infty}^{+\infty} a_I(n) \cdot h_S(t - \varepsilon T_S - nT_S)\right] \cdot e^{j(2\pi\Delta f t+\Delta\varphi)}$$

The transmitted signal s(t) with the additively superimposed, additive white Gaussian noise n(t) according to the reduced block circuit diagram in FIG. 2 is received in the receiver as a received signal r(t), which corresponds to the received signal according to equation (7) of the expanded block circuit diagram according to FIG. 1.

The received signal r(t) is convoluted in an estimation filter 8 according to equation (9) with its impulse response $h_{EST}(t)$ and leads to the signal v(t) at the output of the estimation filter 8, which represents a filtered in-phase and quadrature symbol sequence distorted with regard to signal error, frequency offset and phase offset:

$$v(t) = r(t) * h_{EST}(t) \qquad (9)$$

In the case of a PAM, QPSK and π/4 QPSK signal, document [1] discloses a method for determining the timing offset ε in the clock synchronisation, which represents the prior art and therefore allows a better understanding of the method according to the invention and the device according to the invention for clock synchronisation in the case of an offset QPSK signal. This method is therefore described below.

According to [1], the conditional likelihood function $L(\varepsilon|\underline{u})$ shown in equation (10), which is dependent upon the timing offset ε and the symbol values $$\underline{u} = \sum_v u_v$$

transmitted in the observation period, is described as a modulus-error-squared, integrated over the observation period $T_0$ between the registered, noise-laden received signal r(t) and the ideal, noise-free, modelled transmitted signal $\bar{s}(t)$ subject to the sought timing offset ε.

$$L(\varepsilon | \underline{u}) = e^{-\frac{1}{N_0}\int_{T_0}|r(t)-s(t,\underline{u},\varepsilon)|^2 dt} \qquad (10)$$

$$= e^{-\frac{1}{N_0}\int_{T_0}|r^2(t)-2r(t)s(t,\underline{u},\varepsilon)+s^2(t,\underline{u},\varepsilon)|^2 dt} \leq 1$$

The use of the inverted exponential function and the division of the argument of the exponential function by the noise power density $N_0$ leads to a scaling of the conditional likelihood function $L(\varepsilon|\underline{u})$ to values less than one. In order to neutralise the likelihood functioning $L(\varepsilon)$ from the symbol values $\underline{u}$ transmitted in the time interval $T_0$, the conditional likelihood function $L(\epsilon|\underline{u})$ over the observation period $T_0$ is linked with the interconnected distribution density function $p_{\underline{a}}(\underline{u})$, which describes the probability of occurrence of the symbol values $\underline{u}$ transmitted in the time interval $T_0$ within the symbol alphabet $\underline{a}$, as shown in equation (11).

$$L(\varepsilon) = \int_{\underline{u}} L(\varepsilon|\underline{u}) \cdot p_{\underline{a}}(\underline{u}) d\underline{u} \qquad (11)$$

The maximum-likelihood estimation can, in principle, be implemented within the framework of a simplified model for clock recovery over a limited number of symbols with an infinitely long observation time $T_0$ or within the framework of a more realistic model for clock recovery over an unlimited number of symbols with a limited observation time $T_0$. The simplified model is presented here. In this case, an integration of the moduluis-error squared over an infinite integration period is derived according to equation (12) for the mathematical relationship of the conditional likelihood function $L(\epsilon|\underline{u})$ in equation (10):

$$L(\varepsilon|\underline{u}) = e^{-\frac{1}{N_0} \int_{-\infty}^{+\infty} |r^2(t) - 2r(t)s(t,\underline{u},\varepsilon) + \bar{s}^2(t,\underline{u},\varepsilon)|^2 dt} \qquad (12)$$

The following considerations apply for the individual terms in the integral of the conditional likelihood function $L(\epsilon|\underline{u})$ of the equation (12):

Since the term for the squared received signal $r^2(t)$ is independent of the timing offset $\epsilon$, this term can be taken as a constant before the exponential function.

With a limited symbol number N, the modelled transmitted signal $\bar{s}(t, \underline{u}, \epsilon)$ according to equation (13) is described, by way of deviation from equation (3), as a multiplicatively linked Dirac comb with the symbol duration $T_s$, and the symbol values $u_V$, which is convoluted with the impulse response $h_s(t)$ of the transmitter filter 3.

$$\bar{s}(t, \underline{u}, \varepsilon) = \sum_{n=0}^{N-1} u_v \cdot T_S \cdot h_S(t - \varepsilon T_S - nT_S) \qquad (13)$$

Taking into consideration the scaling of the transmitter filter 3 presented in equation (14), the mathematical context described in equation (15) is derived for the integral of the squared, modelled transmitted signal $\bar{s}^2(t, \underline{u}, \epsilon)$:

$$T_S \cdot h_S(0) = \int_{-\infty}^{+\infty} T_S \cdot h_S^2(t) dt = 1 \qquad (14)$$

$$\int_{-\infty}^{+\infty} \bar{s}^2(t, \underline{u}, \varepsilon) dt = \int_{-\infty}^{+\infty} \sum_{n=0}^{N-1} T_S^2 \cdot u_n^2 \cdot h_S^2(t - \varepsilon T_S - nT_S) \qquad (15)$$

$$= \sum_{n=0}^{N-1} T_S \cdot u_n^2$$

The mathematical context shown in equation (16) is derived for the integral of the product of the received signal and the modelled transmitted signal $r(t)\cdot\bar{s}(t,\underline{u},\epsilon)$:

$$\int_{-\infty}^{+\infty} r(t) \cdot \bar{s}(t, \underline{u}, \varepsilon) dt = \int_{-\infty}^{+\infty} r(t) \cdot \sum_{n=0}^{N-1} T_S \cdot u_n \cdot h_S\left(\frac{t-}{\varepsilon T - nT_S}\right) dt \qquad (16)$$

$$= \sum_{n=0}^{N-1} T_S \cdot u_n \cdot \int_{-\infty}^{+\infty} r(t) \cdot h_S\left(\frac{t-}{\varepsilon T_S - nT_S}\right) dt$$

$$= \sum_{n=0}^{N-1} T_S \cdot u_n \cdot \begin{bmatrix} r(nT_S + \varepsilon T_S)* \\ h_S(-nT_S - \varepsilon T_S) \end{bmatrix}$$

$$= \sum_{n=0}^{N-1} T_S \cdot u_n \cdot e(nT_S + \varepsilon T_S)$$

The mathematical relationship of the estimation filter 8 in equation (9) is taken into consideration in the last step of equation (16).

Now, if the knowledge obtained above for the mathematical terms of the integral of the conditional likelihood function $L(\epsilon|\underline{u})$ in equation (12) are taken into consideration, the mathematical relationship shown in equation (17) is obtained for the conditional likelihood function $L(\epsilon|\underline{u})$:

$$L(\varepsilon|\underline{u}) = const \cdot e^{-\frac{T}{N_0} \sum_{n=0}^{N-1}[u_n^2 - 2u_n e(nT_S + \varepsilon T_S)]} \qquad (17)$$

$$= const \cdot \prod_{n=0}^{N-1} e^{-\frac{T_S}{N_0}(u_n^2 - 2u_n e(nT_S + \varepsilon T_S))}$$

Because of the statistically-independent occurrence of the individual symbols, equation (18) applies for the interconnected distribution density function $p_{\underline{a}}(\underline{u})$:

$$p_{\underline{a}}(\underline{u}) = \prod_{n=0}^{N-1} p_{a_n}(u_n) \qquad (18)$$

Accordingly, the mathematical relationship in equation (19) is derived for the likelihood function $L(\epsilon)$, which is converted, by introducing the log-likelihood function $l(\epsilon)=\ln(L(\epsilon))$ into the corresponding mathematical relationship for the log likelihood function $l(\epsilon)$ in equation (20):

$$L(\varepsilon) = const \cdot \int_{-\infty}^{+\infty} \prod_{n=0}^{N-1} e^{-\frac{T_S}{N_0}(u_n^2 - 2u_n e(nT_S + \varepsilon T_S))} \cdot p_{a_n}(u_n) du_n \qquad (19)$$

$$l(\varepsilon) = const \cdot \sum_{n=0}^{N-1} \ln\left(\int_{-\infty}^{+\infty} e^{-\frac{T_S}{N_0}(u_n^2 - 2u_n e(nT_S + \varepsilon T_S))} \cdot p_{a_n}(u_n) du_n\right) \qquad (20)$$

As equation (20) shows, the log likelihood function $l(\epsilon)$ can be interpreted from a filtering of the received signal $r(t)$ with an estimation filter—signal $e(nT_s+\epsilon T_s)$—, a nonlinear signal processing—inverted exponential function, integration, logarithm function—and an averaging—summation—.

The nonlinear signal-processing function can be approximated by a modulus squaring, as shown in [1].

Figure 3:
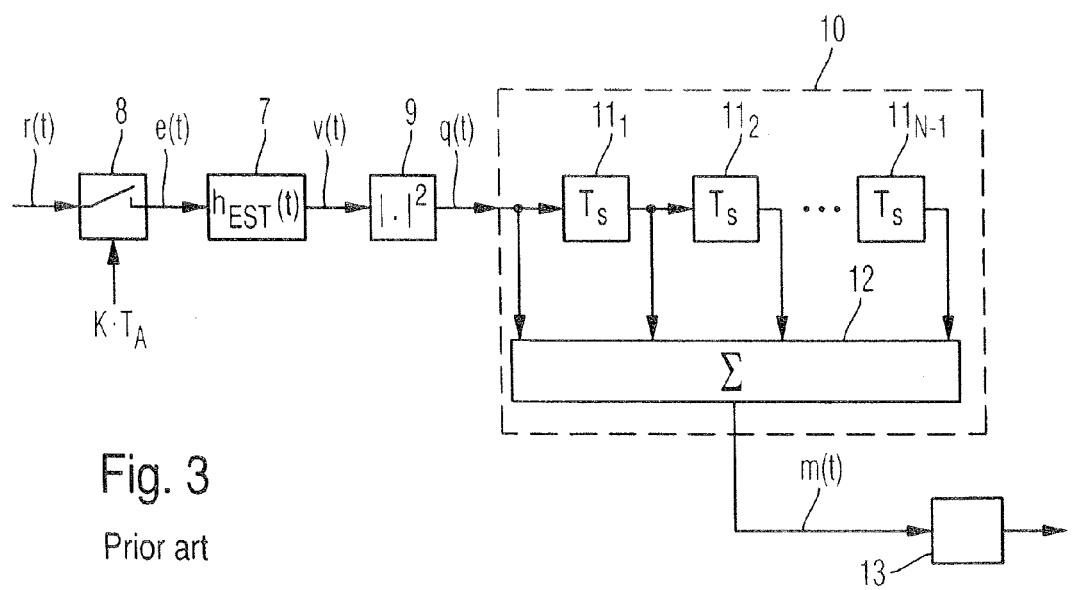
FIG. 3 shows a circuit diagram of the device for clock synchronisation according to the prior art.

The block circuit diagram presented in FIG. 3 of a device for determining the timing offset $\epsilon$ for the clock synchronisation of a PAM, QPSK and/or π/4 QPSK signal on the basis of a maximum-likelihood estimation, which represents the prior art, is obtained in the above manner.

Before the estimation filter 7, the received signal r(t) is sampled in a sampling and holding element 8 at a sampling rate $f_A$, which is increased by comparison with the symbol frequency $f_s$, of the received signal r(t) by the oversampling factor os. In this context, the oversampling factor Os must have a value of at least 8, because, with a roll-off factor r of the estimation filter 7 of one (r=1), the frequency spectrum of the sampled, received signal e(t) provides frequency components less than or equal to the symbol frequency ($|f|\pm f_s$), as a result of the subsequent modulus squaring, which corresponds to a convolution, the bandwidth of the signal is doubled, and another multiplication of the signal then takes place, which additionally doubles the bandwidth of the signal.

If the transmitter filter 2 according to equation (21) has a frequency spectrum $H_s(f)$, which corresponds to a cosine filter with a roll-off factor r, the combined frequency spectrum $H_{EST}(f)$ of the estimation filter 7 according to equation (22) must be designed dependent upon the frequency spectrum $H_s(f)$ of the transmitter filter 2, in order to minimise data-dependent jitter in the received signal r(t).

$$H_s(f) = \begin{cases} 1 & \text{für } |f| < \frac{f_S}{2} \\ \cos\left[\frac{\pi|f|}{2rf_S} - \frac{\pi(1-r)}{4r}\right] & \text{für } (1-r)\frac{f_S}{2} < |f| \leq (1+r)\frac{f_S}{2} \\ 0 & \text{für } (1+r)\frac{f_S}{2} < |f| \end{cases} \quad (21)$$

$$H_{EST}(f) = \begin{cases} H_S(f-f_S) + H_S(f+f_S) & \text{für } |f| \leq \frac{f_S}{2}(1+r) \\ \text{beliebig} & \text{für } \frac{f_S}{2}(1+r) < |f| \leq f_S \\ 0 & \text{für } f_S < |f| \end{cases} \quad (22)$$

[beliebig=random; für=for]

Figure 4A:
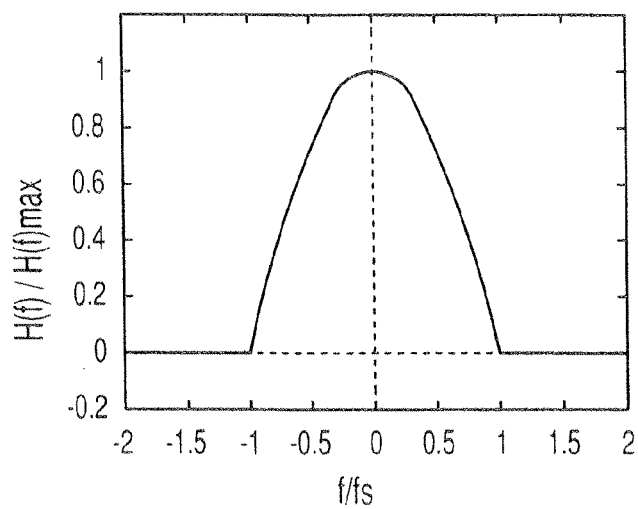
FIGS. 4A, 4B show a frequency response of the transmission filter for a PAM, QPSK or π/4-QPSK signal with a roll-off factor of 1 and 0.5.
Figure 4B:
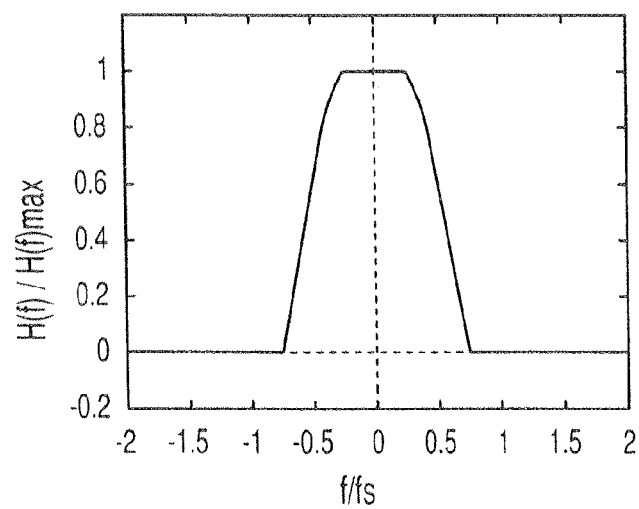

The frequency response $H_s(f)$ of the transmitter filter 2 is presented in FIG. 4A for a roll-off factor r=1, and in FIG. 4B for a roll-off factor r=0.5. The frequency response $H_{GES}(f) = H_s(f) \cdot H_{EST}(f)$ of the transmission system as a whole, consisting of transmitter filter 2 and estimation filter 7, is presented for a roll-off factor r=1 in FIG. 4C, and for a roll off factor r=0.5 in FIG. 4D.

Figure 4C:
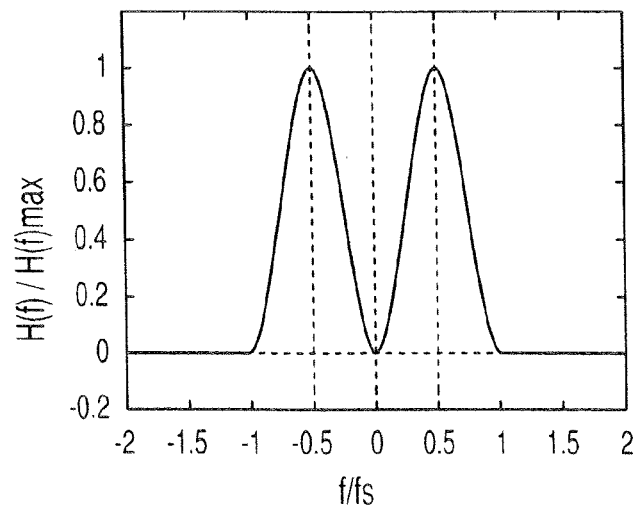
FIGS. 4C, 4D show a frequency response of the overall transmission path with a roll-off factor of 1 and 0.5.
Figure 4D:
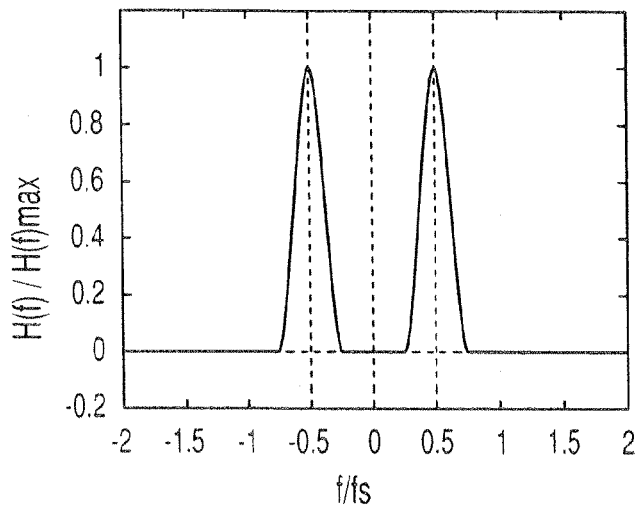

If the frequency response $H_{GES}(f)$ in FIG. 4C or FIG. 4D respectively is observed, this frequency response can be interpreted according to equation (23) as a low-pass filter $H_{GES0}(f)$ symmetrical to the frequency f=0 with a bandwidth of $$\frac{f_S}{2} \cdot r,$$

which is frequency-displaced respectively by $$\pm \frac{f_S}{2}:$$

$$H_{GES}(f) = H_{GES0}(f) * \left(\delta\left(f - \frac{f_S}{2}\right) + \delta\left(f + \frac{f_S}{2}\right)\right) \quad (23)$$

$$= H_{GES0}\left(f - \frac{f_S}{2}\right) + H_{GES0}\left(f + \frac{f_S}{2}\right)$$

The corresponding impulse response $h_{GES}(t)$ is therefore derived according to equation (24):

$$h_{GES}(t) = h_{GES0}(t) \cdot \left(e^{j2\pi\frac{f_S}{2}t} + e^{-j2\pi\frac{f_S}{2}t}\right) \quad (24)$$

$$= h_{GES0}(t) \cdot \cos\left(2\pi\frac{f_S}{2}t\right)$$

According to equation (25), the signal v(t) at the output of the estimation filter 7 can therefore be obtained in that the impulse response $h_s(t)$ of the transmitter filter 2 in the transmitter signal $s_{NF}(t)$ in the baseband according to equation (8) is replaced by the impulse response $h_{GES}(t)$ of the transmission system as a whole:

$$v(t) = s_{NF}(t) * h_{GES}(t) \quad (25)$$

$$= \left[\sum_{n=-\infty}^{+\infty} a_R(n) \cdot h_{GES}(t - \varepsilon T_S - nT_S) + j \cdot \sum_{n=-\infty}^{+\infty} a_I(n) \cdot h_{GES}(t - \varepsilon T_S - nT_S)\right] \cdot e^{j(2\pi\Delta ft + \Delta\varphi)}$$

Starting from equation (25), the impulse response $h_{GES}(t - \epsilon T_s - nT_s)$ can be described by equation (26)

$$h_{GES}(t - \varepsilon T_S - nT_S) = \quad (26)$$
$$h_{GES0}(t - \varepsilon T_S - nT_S) \cdot (-1)^n \cdot \cos\left(2\pi\frac{f_S}{2}(t - \varepsilon T_S)\right)$$

The mathematical relationship for the signal v(t) at the output of the estimation filter 7 can be described according to equation (29) with the combined terms from equations (27) and (28):

$$R(t) = \sum_{n=-\infty}^{+\infty} a_R(n) \cdot h_{GES0}(t - \varepsilon T_S - nT_S) \cdot (-1)^n \quad (27)$$

$$I(t) = \sum_{n=-\infty}^{+\infty} a_I(n) \cdot h_{GES0}(t - \varepsilon T_S - nT_S) \cdot (-1)^n \quad (28)$$

$$v(t) = [R(t) + j \cdot I(t)] \cdot \cos\left(2\pi\frac{f_S}{2}(t - \varepsilon T_S)\right) \cdot e^{j(2\pi\Delta ft + \Delta\varphi)} \quad (29)$$

In the modulus squarer 9, the in-phase and quadrature components of the signal v(t) are respectively squared and then added, so that a signal q(t) according to equation (30) is present at the output of the modulus squarer:

$$q(t) = [R^2(t) + I^2(t)] \cdot \cos^2\left(2\pi \frac{f_S}{2}(t - \varepsilon T_S)\right) \quad (30)$$

$$= = \sum_{n=-\infty}^{+\infty} (a_R^2(n) + a_I^2(n)) \cdot h_{GES0}^2(t - \varepsilon T_S - nT_S) \cdot$$

$$\cos^2\left(2\pi \frac{f_S}{2}(t - \varepsilon T_S)\right)$$

The signal q(t) is then averaged in an averaging filter 10 consisting of altogether N−1 series-connected timing steps 11$_1$, 11$_2$, ..., 11$_{N-1}$, of which the outputs are supplied together with the input of the first timing step 11$_1$ to an adder 12 for summation of the signals q$_m$(t) time-delayed respectively by a different number m of symbol lengths T$_s$. The output signal m(t) of the averaging filter 10 can be obtained according to equation (32) by convolution of the signal q(t) with the impulse response h$_M$(t) of the averaging filter 10 as presented in equation (31).

$$h_M(t) = \sum_{m=0}^{N-1} \delta(t - mT_S) \quad (31)$$

$$m(t) = q(t) * h_M(t) \quad (32)$$

$$= \sum_{m=0}^{N-1} [R^2(t - mT_S) + I^2(t - mT_S)] \cdot$$

$$\cos^2\left(2\pi \frac{f_S}{2}(t - \varepsilon T_S - mT_S)\right)$$

Finally, in the subsequent maximum detector 13, the maximum of the averaged, modulus-squared, filtered received signal e(t), which corresponds, according to equation (20), to the maximum of the log likelihood function l(ε) and therefore to the sought timing offset ε of the clock synchronisation, is determined.

The knowledge obtained with regard to a PAM, QPSK or π/4-QPSK modulated signal for clock synchronisation on the basis of the maximum-likelihood estimation method is used by analogy below for the clock synchronisation of a VSB signal. For this purpose, the mathematical relation for a VSB signal s$_{VSB}$(t) according to equation (33) is converted below into a form equivalent to the equation (1) for a PAM, QPSK or π/4-QPSK modulated signal.

$$s_{VSB}(t) = \sum_{v=-\infty}^{+\infty} q(v) \cdot \delta(t - v \cdot T_{VSB}) \quad (33)$$

In this context, the values q(v) in a 2VSB signal represent the symbol sequence with the symbol alphabet {+1, −1} and the symbol duration T$_{VSB}$, to which an additional pilot carrier is added.

Figure 5:
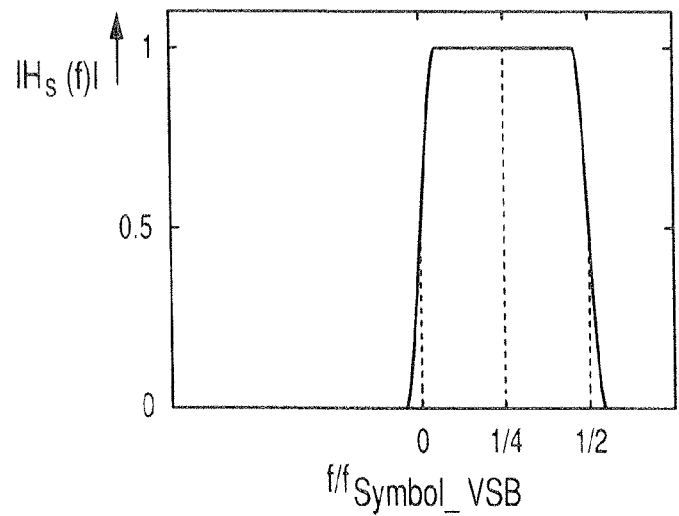
FIG. 5 shows a frequency response of the transmission filter for a VSB signal.
Figure 8:
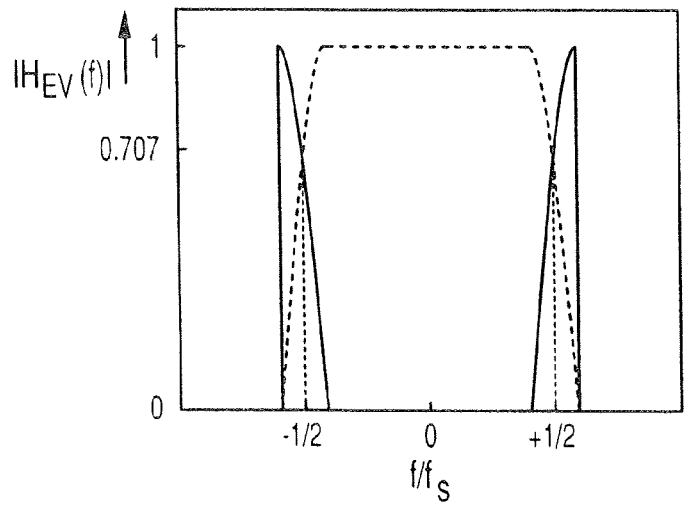
FIG. 8 shows a frequency response of the estimation filter consisting of receiver filter and pre-filter.

As in the case of a PAM, QPSK or π/4 QPSK modulated signal, the transmitter filter for a VSB signal is also a cosine filter. However, by way of distinction from a PAM, QPSK or π/4 QPSK-modulated signal, it is symmetrical to the frequency $$f = \frac{1}{4} \cdot f_{SVSB},$$

wherein f is the symbol frequency f$_{sVSB}$ of the VSB signal inverse to the symbol period. Its transmission function H$_{sVSB}$(f) is therefore derived from a displacement of the transmission function H$_s$(f) of a PAM, QPSK or π/4 QPSK modulated signal according to equation (21) by the frequency $$f = \frac{1}{4} \cdot f_{SVSB}$$

in the sense of equation (34) and FIG. 5.

$$H_{SVSB}(f) = H_S\left(f - \frac{1}{4} \cdot f_{Symbol\_VSB}\right) \quad (34)$$

The impulse response h$_{SVSB}$(t) of the transmission filter for a VSB signal is therefore derived according to equation (35):

$$h_{SVSB}(t) = h_S(t) \cdot e^{j\frac{2\pi}{4T_{VSB}}t} \quad (35)$$

The VSB signal s$_{FVSB}$(t) disposed at the output of the transmitter filter 2 is therefore derived, by analogy with the case of a PAM, QPSK or π/4 QPSK-modulated signal in equation (2), from a convolution of the VSB signal according to equation (33) with the impulse response h$_{SVSB}$(t) of the transmitter filter according to equation (35), and is described mathematically by equation (36), which is mathematically converted in several further stages:

$$s_{FVSB}(t) = \left(h_S(t) \cdot e^{j\frac{2\pi}{4T_{VSB}}t}\right) * \sum_{v=-\infty}^{+\infty} q(v) \cdot \delta(t - v \cdot T_{VSB}) \cdot \quad (36)$$

$$= = \sum_{v=-\infty}^{+\infty} q(v) \cdot h_S(t - v \cdot T_{VSB}) \cdot e^{j\frac{2\pi}{4T_{VSB}}(t - vT_{VSB})}$$

$$= = e^{j\frac{2\pi}{4T_{VSB}}t} \cdot \sum_{v=-\infty}^{+\infty} q(v) \cdot e^{-j\frac{\pi}{2}v} \cdot h_S(t - v \cdot T_{VSB})$$

According to equation (37), the parameter b(v) is introduced for the term $$q(v) \cdot e^{-j\frac{\pi}{2}v}$$

in equation (36), $$b(v) = q(v) \cdot e^{-j\frac{\pi}{2}v} \quad (37)$$

If the parameter b(v) is taken separately for even-numbered and odd-numbered v, the mathematical relationship in equation (38) is obtained for the parameter b(v) for even-numbered v=2n (n: integer), which leads to real values $a_R(n)$ after a mathematical conversion.

$$b(v)_{v=2n} = e^{-j\frac{\pi}{2}2n} \cdot q(2n) \qquad (38)$$
$$= e^{-j\pi n} \cdot q(2n)$$
$$== (-1)^n \cdot q(2n) := a_R(n)$$

In the case of odd-numbered v=2n+1 (n: integer), the mathematical relationship in equation (39) is obtained for the parameter b(v), which, after mathematical conversion, leads to complex values $j \cdot a_I(n)$:

$$b(v)_{v=2n+1} = e^{-j\frac{\pi}{2}(2n+1)} \cdot q(2n+1) \qquad (39)$$
$$= j \cdot (-1)^{n+1} \cdot q(2n+1) := j \cdot a_I(n)$$

The sum $\sum_{v=-\infty}^{+\infty} q(v) \cdot e^{-j\frac{\pi}{2}v} \cdot h_S(t - v \cdot T_{VSB})$ in equation (36) can be subdivided according to equation (40) into a partial sum for even-numbered v=2n and respectively odd numbered v=2n+1:

$$\sum_{v=-\infty}^{+\infty} q(v) \cdot e^{-j\frac{\pi}{2}v} \cdot h_S(t - v \cdot T_{VSB}) = \sum_{v=-\infty}^{+\infty} b(v)_{v=2n} \cdot h_S(t - 2n \cdot T_{VSB}) + + \qquad (40)$$
$$\sum_{v=-\infty}^{+\infty} b(v)_{v=2n+1} \cdot h_S(t - (2n+1) \cdot T_{VSB})$$

The mathematical relationship for the output signal $s_{FVSB}(t)$ at the output of the transmitter filter 2 in equation (36) can therefore be transferred, according to equation (40) taking into consideration equations (38) and (39), into equation (41):

$$s_{FVSB}(t) = e^{j\frac{2\pi}{4T_{VSB}}t} \cdot \left( \sum_{n=-\infty}^{+\infty} a_R(n) \cdot h_S(t - 2n \cdot T_{VSB}) + \atop j \cdot \sum_{n=-\infty}^{+\infty} a_I(n) \cdot h_S(t - 2n \cdot T_{VSB} - T_{VSB}) \right) \qquad (41)$$

If the vestigial-sideband-modulated baseband received signal $r_{VSB}(t)$ corresponding to the VSB output signal $s_{FVSB}(t)$ at the output of the transmitter filter 2, ignoring the noise signal n(t), is mixed with a signal $$e^{-j\frac{2\pi}{4T_{VSB}}t},$$

if the symbol duration $T_{VSB}$ according to equation (42) is set to be equal to half of the symbol duration $T_s$ of a PAM, QPSK or π/4 QPSK modulated signal, and if the cosine filter $T_s$ of a PAM, QPSK or π/4 QPSK modulated signal, frequency-displaced according to equation (34), is used as the transmitter filter of the VSB signal, a mathematical relationship for the modified baseband received signal $r_{VSB}'(t)$ is derived, starting from equation (41), as shown in equation (43)

$$T_{VSB} = \frac{1}{2} \cdot T_S \qquad (42)$$

$$r'_{VSB}(t) = \qquad (43)$$
$$\sum_{n=-\infty}^{+\infty} a_R(n) \cdot h_S(t - n \cdot T_S) + j \cdot \sum_{n=-\infty}^{+\infty} a_I(n) \cdot h_S\left(t - n \cdot T_{VSB} - \frac{T_{VSB}}{2}\right)$$

By contrast with the mathematical term for a PAM, QPSK or π/4 QPSK signal in equation (2), the mathematical term for the modified VSB baseband received signal $r_{VSB}'(t)$ provides a quadrature component, which is phase-displaced by half a symbol length $T_s$ relative to the in-phase component, and therefore corresponds to an offset QPSK signal.

By analogy with equation (8) for a PAM, QPSK or π/4 QPSK signal, the modified VSB transmitted signal in the baseband $s_{VSBNF}'(t)$, in which the timing offset ε of the clock signal and the existing frequency offset and phase offset Δf and Δϕ of the carrier signal has already been taken into consideration, is described, starting from the mathematical relationship in equation (43), by equation (44):

$$s'_{VSBNF}(t) = \left[ \sum_{n=-\infty}^{+\infty} a_R(n) \cdot h_S\left(\begin{array}{c} t - \\ \varepsilon T_S - nT_S \end{array}\right) + \atop j \cdot \sum_{n=-\infty}^{+\infty} a_I(n) \cdot h_S\left(\begin{array}{c} t - \varepsilon T_S - \\ \frac{T_S}{2} - nT_S \end{array}\right) \right] \cdot e^{j(2\pi\Delta ft + \Delta\varphi)} \qquad (44)$$

Once again, in the presence of a modified VSB baseband received signal $r_{VSB}'(t)$ according to equation (43), the output signal $v_{VSB}'(t)$ of the estimation filter 7 can be derived from the mathematical relationship in equation (25) for the output signal v(t) of the estimation filter 7 in the case of a PAM, QPSK or π/4 QPSK signal s(t) and is presented in equation (45):

$$v'_{VSB}(t) = \left[ \sum_{n=-\infty}^{+\infty} a_R(n) \cdot h_{GES}\left(\begin{array}{c} t - \\ \varepsilon T_S - nT_S \end{array}\right) + \atop j \cdot \sum_{n=-\infty}^{+\infty} a_I(n) \cdot h_{GES}\left(\begin{array}{c} t - \varepsilon T_S - \\ \frac{T_S}{2} - nT_S \end{array}\right) \right] \cdot e^{j(2\pi\Delta ft + \Delta\varphi)} \qquad (45)$$

By analogy with the impulse response $h_{GES}(t-\varepsilon T_S - nT_S)$ in equation (26), the mathematical relationship in equation (46) can be determined for the impulse response $$h_{GES}\left(t - \varepsilon T_S - \frac{T_S}{2} - nT_S\right) \cdot h_{GES}\left(t - \varepsilon T_S - \frac{T_S}{2} - nT_S\right) = \qquad (46)$$
$$h_{GES0}\left(t - \varepsilon T_S - \frac{T_S}{2} - nT_S\right) \cdot (-1)^n \cdot \sin\left(2\pi \frac{f_S}{2}(t - \varepsilon T_S)\right)$$

The combined terms in equations (47) and (48) can be formulated on the basis of the mathematical terms in equations (26) and (46), and accordingly, in the presence of a modified VSB baseband received signal $r_{VSB}'(t)$, the mathematical context for the output signal $v_{VSB}'(t)$ of the estimation filter 7 can be transferred from equation (46) to equation (49).

$$R_{VSB}(t) = \sum_{n=-\infty}^{+\infty} a_R(n) \cdot h_{GES0}(t - \varepsilon T_S - nT_S) \cdot (-1)^n \quad (47)$$

$$I_{VSB}(t) = \sum_{n=-\infty}^{+\infty} a_I(n) \cdot h_{GES0}\left(t - \varepsilon T_S - \frac{T_S}{2} - nT_S\right) \cdot (-1)^n \quad (48)$$

$$v'_{VSB}(t) = \begin{bmatrix} R_{VSB}(t) \cdot \cos\left(2\pi \frac{f_S}{2}(t - \varepsilon T_S)\right) + j \cdot \\ I_{VSB}(t) \cdot \sin\left(2\pi \frac{f_S}{2}(t - \varepsilon T_S)\right) \end{bmatrix} \cdot e^{j(2\pi\Delta f t + \Delta\varphi)} \quad (49)$$

In the presence of a modified VSB baseband received signal $r_{VSB}'(t)$, as in the prior art with a PAM, QPSK or π/4-QPSK signal, if the output signal $v_{VSB}'(t)$ of the estimation filter 7 were to be supplied to a modulus squarer, a signal $q_{VSB}'(t)$ would be obtained at the output of the modulus squarer 9 according to equation (50):

$$q'_{VSB}(t) = R_{VSB}^2(t) \cdot \cos^2\left(2\pi \frac{f_S}{2}(t - \varepsilon T_S)\right) + I_{VSB}^2(t) \cdot \sin^2\left(2\pi \frac{f_S}{2}(t - \varepsilon T_S)\right) \quad (50)$$

The mathematical relationship of the signal $q_{VSB}'(t)$ from equation (50) is converted, resolving the combined terms $R_{VSB}(t)$ and $I_{VSB}(t)$, into the anticipated value $E\{q_{VSB}'(t)\}$ of the signal $q_{VSB}'(t)$ in equation (51). This exploits the trigonometric relationship $$\sin(x) = \cos\left(x - \frac{\pi}{2}\right)$$

and the fact that the symbol alphabet of a modified 2VSB signal contains only the values $\{\pm 1\}$, which do not correlate with one another over the individual sampling times $nT_s$. As a result of the absence of a correlation, the individual products $a_R(iT_s) \cdot a_R(jT_s)$ and respectively $a_I(iT_s) \cdot a_I(jT_s)$ cancel each other out at different sampling times $iT_s$ and $jT_s$ respectively, while the products $a_R^2(iT_s)$ and $a_I^2(iT_s)$ each have the value +1 at the same sampling time $iT_s$.

$$E\{q'_{VSB}(t)\} = \begin{bmatrix} \sum_{n=-\infty}^{+\infty} h_{GES0}^2(t - \varepsilon T_S - nT_S) \cdot \\ \cos^2\left(2\pi \frac{f_S}{2}(t - \varepsilon T_S)\right) + \\ \sum_{n=-\infty}^{+\infty} h_{GES0}^2\left(t - \varepsilon T_S - \frac{T_S}{2} - nT_S\right) \cdot \\ \cos^2\left(2\pi \frac{f_S}{2}\left(t - \varepsilon T_S - \frac{T_S}{2}\right)\right) \end{bmatrix} \quad (51)$$

As can easily be recognised, with the introduction of an auxiliary function $$w(t - nT_S) = h_{GES0}^2(t - \varepsilon T_S - nT_S) \cdot \cos^2\left(2\pi \frac{f_S}{2}(t - \varepsilon T_S)\right),$$

the equation (51) can be converted to the equation (52) for the signal $E\{q_{VSB}'(t)\}$:

$$E\{q'_{VSB}(t)\} = \sum_{n=-\infty}^{+\infty} w(t - nT_S) + w\left(t - \frac{T_S}{2} - nT_S\right) \quad (52)$$

Since for all n, the respective auxiliary function $w(t-nT_s)$ is a function, which is limited to the range $$n \cdot T_S - \frac{T_S}{2} \leq t - \varepsilon T_S \leq n \cdot T_S + \frac{T_S}{2}$$

and which is even at the time $t-\varepsilon T_s = n \cdot T_s$; and at the same time, for all n, the respective auxiliary function $$w\left(t - \frac{T_S}{2} - nT_s\right)$$

is a function, which is limited to the range $n \cdot T_s \leq t - \varepsilon T_s \leq 2 \cdot n \cdot T_s$ and which is even at the time $$t - \varepsilon T_S = n \cdot T_s + \frac{T_S}{2},$$

a constant function is derived by superimposing all auxiliary functions $w(t-nT_s)$ and $$w\left(t - \frac{T_S}{2} - nT_s\right)$$

for the anticipated value $E\{q_{VSB}'(t)\}$ of the signal $q_{VSB}'(t)$ according to equation (53), and the determination of the timing offset ε of the clock synchronisation of a VSB modulated signal via a detection of a maximum according to the prior art is dispensed with.

$$E\{q_{VSB}'(t)\} = const. \quad (53)$$

However, if a pure squaring without modulus formation is implemented according to the invention instead of a modulus squaring of the output signal $v(t)$ of the estimation filter 7 the mathematical relationship shown in equation (54) is obtained, in a first embodiment of the device for clock synchronisation of a VSB signal according to FIG. 5, starting from equation (49) for the output signal $q_{VSB}''(t)$ after a pure squarer 16:

$$q''_{VSB}(t) = \begin{bmatrix} R_{VSB}^2(t) \cdot \cos^2\left(2\pi \frac{f_S}{2}(t - \varepsilon T_S)\right) - \\ I_{VSB}^2(t) \cdot \sin^2\left(2\pi \frac{f_S}{2}(t - \varepsilon T_S)\right) + \\ j \cdot 2 \cdot R_{VSB}(t) \cdot I_{VSB}(t) \cdot \\ \cos\left(2\pi \frac{f_S}{2}(t - \varepsilon T_S)\right) \cdot \\ \sin\left(2\pi \frac{f_S}{2}(t - \varepsilon T_S)\right) \end{bmatrix} \cdot e^{j2(2\pi\Delta f t + \Delta\varphi)} \quad (54)$$

Using the relationships $$\cos(x) = \frac{1}{2}(e^{jx} + e^{-jx})$$

and $$\sin(x) = \frac{1}{2j}(e^{jx} + e^{-jx}),$$

the mathematical relationship for the signal $q_{VSB}''(t)$ in equation (54) can be transformed according to equation (55).

$$q_{VSB}''(t) = \begin{bmatrix} \frac{1}{4}(R_{VSB}(t) + I_{VSB}(t))^2 \cdot \\ e^{j(2\pi f_S(t-\varepsilon T_S))} + \\ \frac{1}{4}(R_{VSB}(t) - I_{VSB}(t))^2 \cdot \\ e^{-j(2\pi f_S(t-\varepsilon T_S))} + \\ \frac{1}{2}(R_{VSB}^2(t) - I_{VSB}^2(t)) \end{bmatrix} \cdot e^{j2(2\pi\Delta ft + \Delta\varphi)} \quad (55)$$

The signal $q_{VSB}''(t)$ represents a superimposition of three periodic signal components rotating respectively at the frequency $f_s+\Delta f$, $-f_s+\Delta f$ and $\Delta f$, each of which can be sampled with the Dirac pulses of the additively and multiplicatively linked combined terms $R_{VSB}(t)$ and $I_{VSB}(t)$ By contrast with the anticipated value $E\{q_{VSB}'(t)\}$ of the signal $q_{VSB}'(t)$ discussed above, the signal $q_{VSB}''(t)$ therefore represents a periodic signal, which contains a discrete spectral pair $\pm f_s$, of which the maximum can be determined with a maximum detector 13 and which supplies the sought timing offset $\epsilon$ for the clock synchronisation of a VSB signal.

The mathematical relationship for the signal $q_{VSB}''(t)$ in equation (55) can be further simplified by resolving the combined terms $R_{VSB}^2(t)$ and $I_{VSB}^2(t)$:

The spectrum associated with the anticipated value $E\{R_{VSB}^2(t)\}$ of the combined term $R_{VSB}^2(t)$ and the anticipated value $E\{I_{VSB}^2(t)\}$ of the combined term $I_{VSB}^2(t)$ is observed in order to determine the anticipated value $E\{R_{VSB}^2(t)\}$ of the combined term $R_{VSB}^2(t)$ and, by analogy, the anticipated value $E\{I_{VSB}^2(t)\}$ of the combined term $I_{VSB}^2(t)$. The associated modulus of the spectrum, which corresponds respectively to the convolution $|H_{GES0}(f)|*|H_{GES0}(f)|$ of the modulus $|H_{GES0}(f)|$ of a low pass filter symmetrical to the frequency $f=0$ relative to itself, is used by way of approximation, for the spectrum of the respective anticipated values $E\{R_{OQPSK}^2(t)\}$ and $E\{I_{OQPSK}^2(t)\}$. Because of the band limitation of the low pass filter at the level of $$|f| \leq \frac{f_S}{2},$$

the result of the convolution is band-limited to $|f| \leq f_s$, so that the spectrum of the respective anticipated values $E\{R_{VSB}^2(t)\}$ and $E\{I_{VSB}^2(t)\}$ is zero at all relevant frequencies $\pm i \cdot f_S$ (i: integer factor) with the exception of the equal component ($i=0$). The corresponding anticipated values $E\{R_{VSB}^2(t)\}$ of the combined term $R_{VSB}^2(t)$ and $E\{I_{VSB}^2(t)\}$ of the combined term $I_{VSB}^2(t)$ are therefore derived taking into consideration equation (50) and (51) respectively as a constant factor $c_0$, which corresponds to the modulus of the result of the convolution $|H_{GES0}(f=0)|*|H_{GES0}(f=0)|$ at the frequency 0.

The two convolutions $|H_{GES0}'(f)|*|H_{GES0}'(f)|$ and respectively $|H_{GES0}''(f)|*|H_{GES0}''(f)|$, which differ because of the addition and subtraction from the above convolution $|H_{GES0}(f)|*|H_{GES0}(f)|$, are derived for the anticipated values $E\{(R_{VSB}(t)+I_{VSB}(t))^2\}$ and $E\{(R_{VSB}(t)-I_{VSB}(t))^2\}$ in exactly the same manner as for the observation of the moduli of the associated spectra described above. Here also, the convolutions are band-limited to $|f| \leq f_s$ because of the squaring, so that the spectra of the anticipated values $E\{(R_{VSB}(t)+I_{VSB}(t))^2\}$ and $E\{(R_{VSB}(t)-I_{VSB}(t))^2\}$ are zero at the frequencies $\pm i \cdot f_S$ with the exception of the equal component ($i=0$). The corresponding anticipated values $E\{(R_{VSB}(t)+I_{VSB}(t))^2\}$ and $E\{(R_{VSB}(t)-I_{VSB}(t))^2\}$ are therefore derived as constant values $c_0'$ and $c_0''$.

Accordingly, starting from equation (55), the mathematical relationship in equation (56) is derived for the anticipated value $E\{q_{VSB}''(t)\}$ of the signal $q_{VSB}''(t)$:

$$E\{q_{VSB}''(t)\} = \begin{bmatrix} c_0' \cdot e^{j2\pi f_S(t-\varepsilon T_S)} + \\ c_0'' \cdot e^{-j2\pi f_S(t-\varepsilon T_S)} \end{bmatrix} \cdot e^{j2(2\pi\Delta ft + \Delta\varphi)} \quad (56)$$

It is evident from equation (56) that the determination of the timing offset $\epsilon$ is reduced to a pure observation of the phase. The mathematical relationships in equation (57) and (58) are obtained from the two phases $\phi_1$ and $\phi_2$ of the two complex signal components of the anticipated value $E\{q_{VSB}''(t)\}$ of the signal $q_{VSB}''(t)$ in equation (56). The timing offset $\epsilon$ is derived by subtraction of the phases $\phi_1$ and $\phi_2$ and subsequent scaling with the factor $\frac{1}{4\pi}$ according to equation (59):

$$\varphi_1 = -2\pi\varepsilon + 2\Delta\varphi \quad (57)$$

$$\varphi_2 = 2\pi\varepsilon + 2\Delta\varphi \quad (58)$$

$$\varepsilon == \frac{1}{4\pi}(-\varphi_1 + \varphi_2) \quad (59)$$

Against this mathematical background, the following section describes the first embodiment of the device according to the invention for clock synchronisation with a VSB signal. In this context, identical reference numbers are used for functional units, which have not changed by comparison with the device for clock synchronisation according to the prior art shown in FIG. 3.

Figure 6:
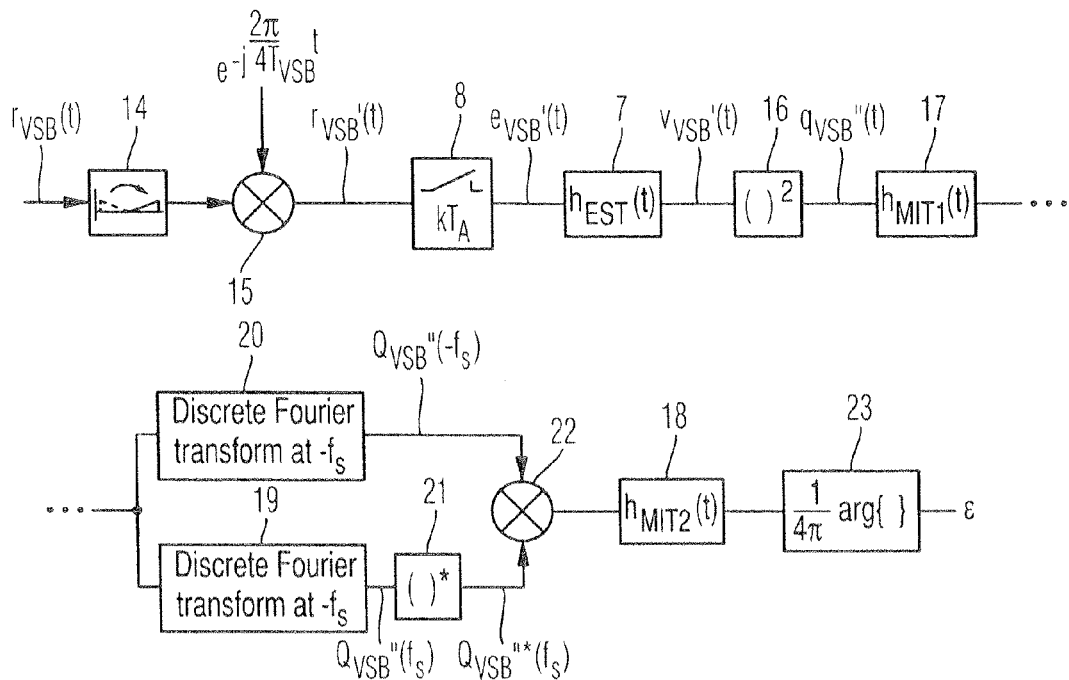
FIG. 6 shows a block circuit diagram of a first embodiment of the device according to the invention for clock synchronisation with a VSB signal.

In the case of an inverted position of the sideband, the first embodiment of the device according to the invention for clock synchronisation with a VSB signal, as shown in FIG. 6, implements a mirroring of the sideband on the VSB received signal $r_{VSB}(t)$ into the normal position at the carrier frequency $f_T$ in a unit for sideband mirroring 14.

Following this, in a down mixer 15, the VSB received signal $r_{VSB}(t)$ is mixed down by means of a mixer signal $$e^{-j\frac{2\pi}{4T_{VSB}}t}$$

by the frequency $f_{SVSB}/4$ into a modified received signal $r_{VSB}'(t)$ according to equation (43).

Following this, in a similar manner to the prior art as shown in FIG. 3, the modified VSB received signal $r_{VSB}'(t)$ is sampled in a downstream sampling and holding element 8 with an oversampling factor os. The sampled, modified VSB baseband received signal $e_{VSB}'(t)$ is supplied to an estimation filter 7 to remove data-dependent jitter in the useful signal. By contrast with the prior art, the output signal $v_{VSB}(t)$ of the estimation filter 7 is then squared with a squarer 16 without a formation of the modulus.

The squared and filtered VSB baseband received signal $q_{VSB}''(t)$ is then averaged, also by analogy with the averaging filter 12 of the prior art in FIG. 3. In this context, the averaging according to the invention is subdivided into a first averaging filter 17 with the impulse response $h_{MIT1}(t)$ and a second averaging filter 18 following later in the signal path with the impulse response $h_{MIT2}(t)$. The separation of the averaging into two averaging steps is based on the fact that the two spectral lines of the squared, filtered received signal $q_{VSB}''(t)$, as shown in equation (56), are frequency-displaced relative to the two symbol frequencies $\pm f_s$ by the frequency offset $2 \cdot \Delta f$ of the carrier signal. To ensure that these two spectral lines of the squared, pre-filtered received signal $q_{VSB}''(t)$ are disposed within the throughput range of the averaging filter, the bandwidth of the first averaging filter 17 must be designed to be appropriately broad.

The impulse response $h_{MIT1}(t)$ of the first averaging filter 17 is derived, by an analogy with the impulse response $h_M(t)$ of the averaging filter of the prior art, as shown in equation (34), from an averaging of a total of N symbols. The bandwidth of the first averaging filter 17, expanded in view of the above consideration, brings about a shortened averaging length. In order to achieve an averaging length required for a given averaging quality in the device according to the invention, a second averaging filter 18 is introduced, which filters via a multiple of the averaging length of the first averaging filter 17—altogether I·N symbol lengths.

In a first discrete Fourier transformer 19 following the first averaging filter 17, the Fourier transform of the pre-filtered, squared and averaged received signal is determined at the frequency $f_s$. The Fourier transform of the pre-filtered, squared and averaged received signal is calculated in a similar manner at the frequency $-f_s$, in a second discrete Fourier transformer 20. The Fourier transforms of the pre-filtered, squared and averaged received signal at the frequency $f_s$ is conjugated with regard to its phase in a downstream conjugator 21. Finally, the conjugated Fourier transform of the pre-filtered, squared and averaged received signal at the frequency $f_s$ is multiplied in a multiplier 22 by the Fourier transform of the pre-filtered, squared and averaged received signal at the frequency $-f_s$.

The multiplier 22 is followed by the second averaging filter 18 mentioned above with the impulse response $h_{MIT2}(t)$ according to equation (60).

$$h_{MIT2}(t) = \sum_{i=0}^{I-1} \delta(t - i \cdot N \cdot T_S) \quad (60)$$

The second averaging filter 18 is used to remove further interference.

In the final signal-processing unit 23, in the sense of equation (59), the timing offset $\epsilon$ is determined by argument formation—determination of the phase of the two Fourier transforms of the pre-filtered, squared and averaged received signal $q_{VSB}''(t)$ multiplied together—at the two frequencies $\pm f_s$ and scaled by the factor $1/4\pi$.

Figure 7:
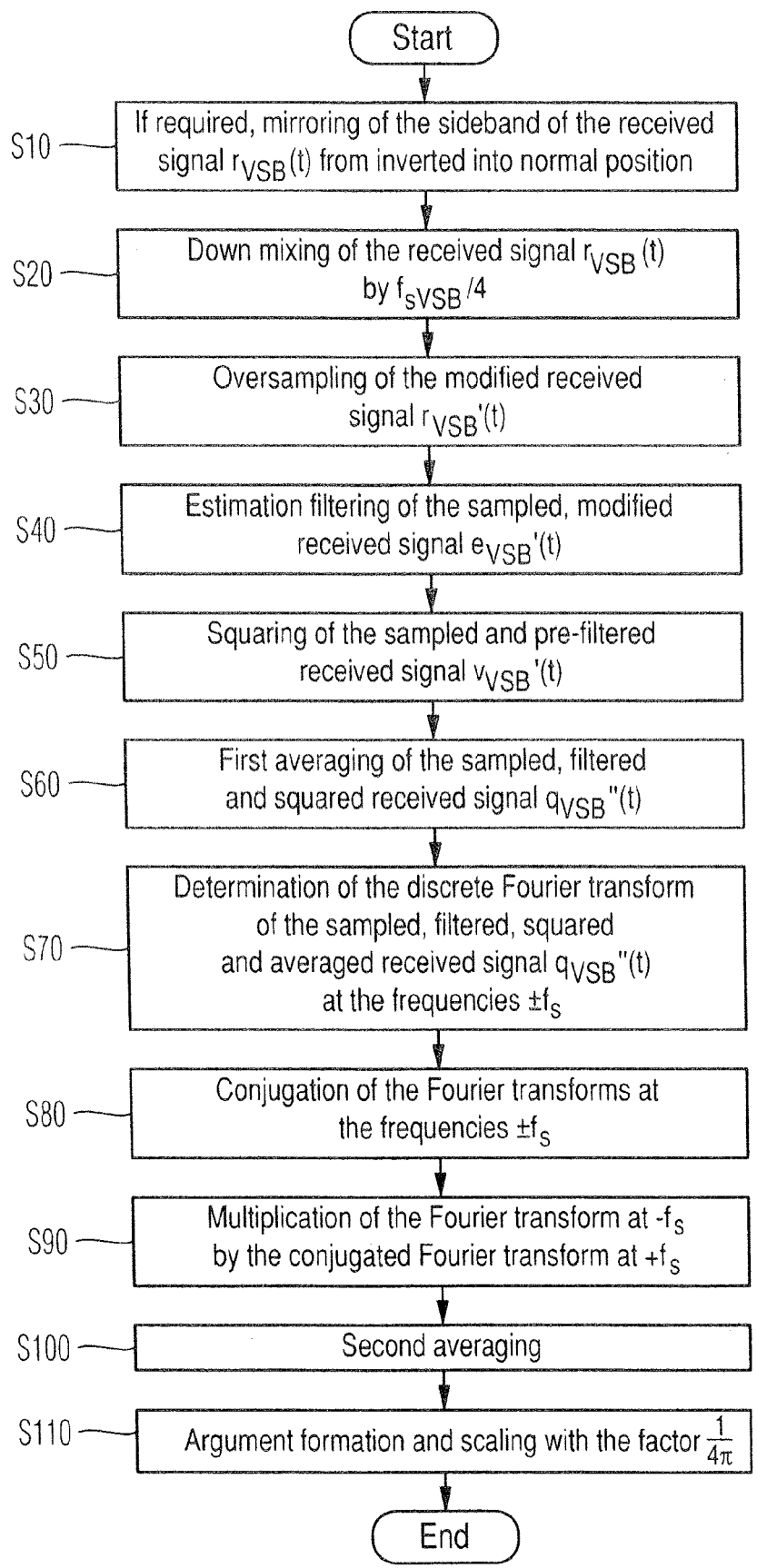
FIG. 7 shows a flow chart of a first embodiment of the method according to the invention for clock synchronisation with a VSB signal.

In procedural stage S10, the associated first embodiment of the method according to the invention for clock synchronisation with a VSB signal, as shown in FIG. 7, implements a mirroring of the sideband of the VSB baseband received signal $r_{VSB}(t)$ by the carrier frequency $f_T$ from an inverted position into a normal position, if the sideband is disposed in the inverted position.

In the next procedural stage S20, the VSB baseband received signal $r_{VSB}(t)$ is mixed down according to the invention with a mixer signal $$e^{-j4\frac{2\pi}{T_{VSB}}t}$$

by the frequency $f_{SVSB}/4$ into a modified received signal $r_{VSB}'(t)$ according to equation (43).

In the next procedural stage S30, the modified VSB baseband received signal $r_{VSB}'(t)$ is oversampled in a sampling and holding element 8 with an oversampling factor os of 8, in order to satisfy the Nyquist condition by frequency doubling on the basis of squaring and multiplication.

In procedural stage S40, an estimation filtering of the sampled, modified VSB baseband received signal $e_{VSB}'(t)$ takes place in an estimation filter 7 according to equation (45) or respectively (49). The transmission function $H_{EST}(f)$ of the estimation filter 7 according to equation (22) is presented in FIG. 8. The transmission function $H_{GES}(f)$ composed of the transmission filter and estimation filter with its equidistant zero throughputs according to equation (23) is absolutely necessary for asymptotic (SNR=∞), error-free estimates of the timing offset $\epsilon$.

Finally, in the next procedural stage S50 the filtered and sampled VSB baseband received signal $v_{VSB}'(t)$ is squared in a squarer 16.

The filtered, sampled and squared received signal $q_{VSB}''(t)$ is averaged in the subsequent procedural stage S60 in a first averaging filter 17 according to equation (31) over a total of N symbol lengths.

The next procedural stage S70 comprises the determination of the discrete Fourier transform $Q_{VSB}''(f)$ respectively at the frequencies $\pm f_s$ in the first and second discrete Fourier transformer 19 and 20.

The conjugation of the discrete Fourier transforms $Q_{VSB}''$ (fs) at the frequency $f_s$ is implemented in the next procedural stage S80 in a conjugator 21.

The conjugated Fourier transform $Q_{VSB}''^*(fs)$ at the frequency $f_S$ is multiplied by the Fourier transform $Q_{VSB}''(-f_S)$ in a multiplier 22 at the frequency $-f_s$ in the subsequent procedural stage S80.

The second averaging of the two Fourier transforms $Q_{VSB}''^*(f_S)$ and $Q_{VSB}''(-f_S)$ multiplied together over a total of I·N symbol lengths takes place in the next procedural stage S100 in a second averaging filter 18.

In the final procedural stage S110, the argument of the two Fourier transforms $Q_{VSB}''^*(f_S)$ and $Q_{VSB}''(-f_S)$ multiplied with one another and averaged is determined, and a scaling with a scaling factor $1/4\pi$ is carried out to determine the timing offset $\epsilon$.

Figure 9:
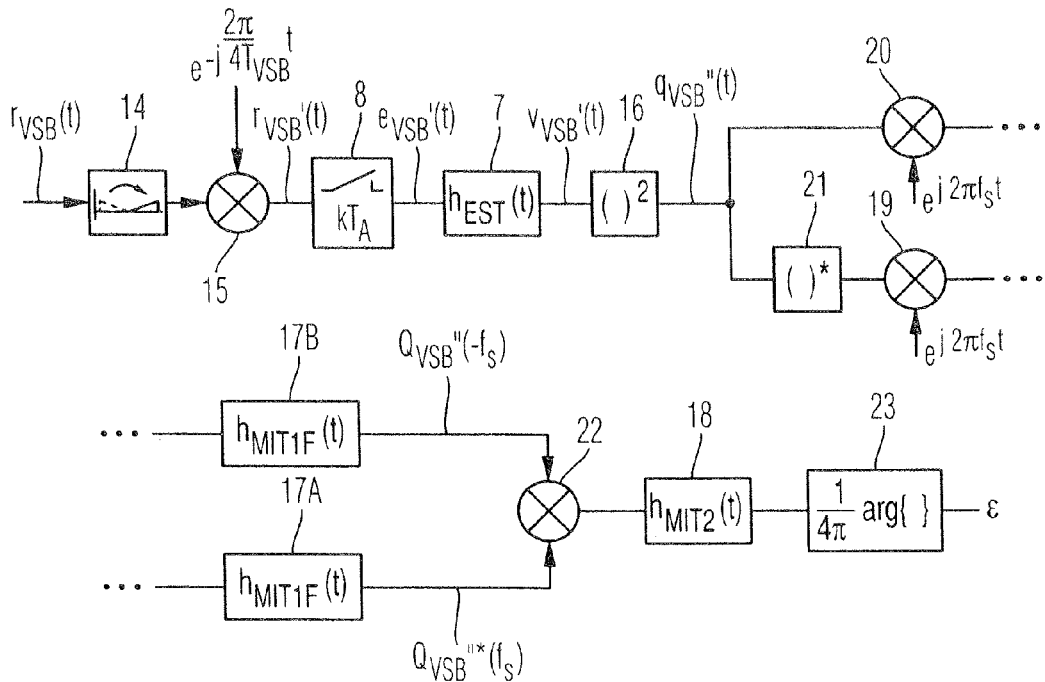
FIG. 9 shows a block circuit diagram of a second embodiment of the device according to the invention for clock synchronisation with a VSB signal.

FIG. 9 shows a second embodiment of the device according to the invention for clock synchronisation with a VSB signal. Identical functional units to those in the first embodiment shown in FIG. 6 have been indicated with the same reference numbers.

The second embodiment of the device according to the invention for clock synchronisation with a VSB signal shown in FIG. 9 is identical, in its functional structure along the signal path as far as the squarer 16, to the first embodiment shown in FIG. 6. After this, by contrast with the first embodiment, the averaging in the first averaging filter and the discrete Fourier transformation in the first and second discrete Fourier transformer including the conjugation in the conjugator are exchanged with one another in the second embodiment.

Accordingly, the squarer is followed by the conjugator 21 for the conjugation of the filtered, sampled and squared received signal $q_{VSB}''(t)$, with a first discrete Fourier transformer 19 for the implementation of the discrete Fourier transformation of the filtered, sampled, squared and conjugated received signal $q_{VSB}''(t)$ at the frequency $f_S$ and parallel to this, a second discrete Fourier transformer 20 for the implementation of the discrete Fourier transformation of the filtered, sampled and squared received signal $q_{VSB}''(t)$ at the frequency $-f_S$ In the second embodiment, the first averaging filter 17 of the first embodiment, is connected as a first averaging filter 17A and 17B respectively downstream of the first and second discrete Fourier transformer 19 and 24 for the implementation of the first averaging of the two discrete Fourier transforms $Q_{VSB}''^*(f_S)$ and $Q_{VSB}''(-f_S)$. The further functional structure in the signal path of the second embodiment corresponds to the functional structure of the first embodiment.

Figure 10:
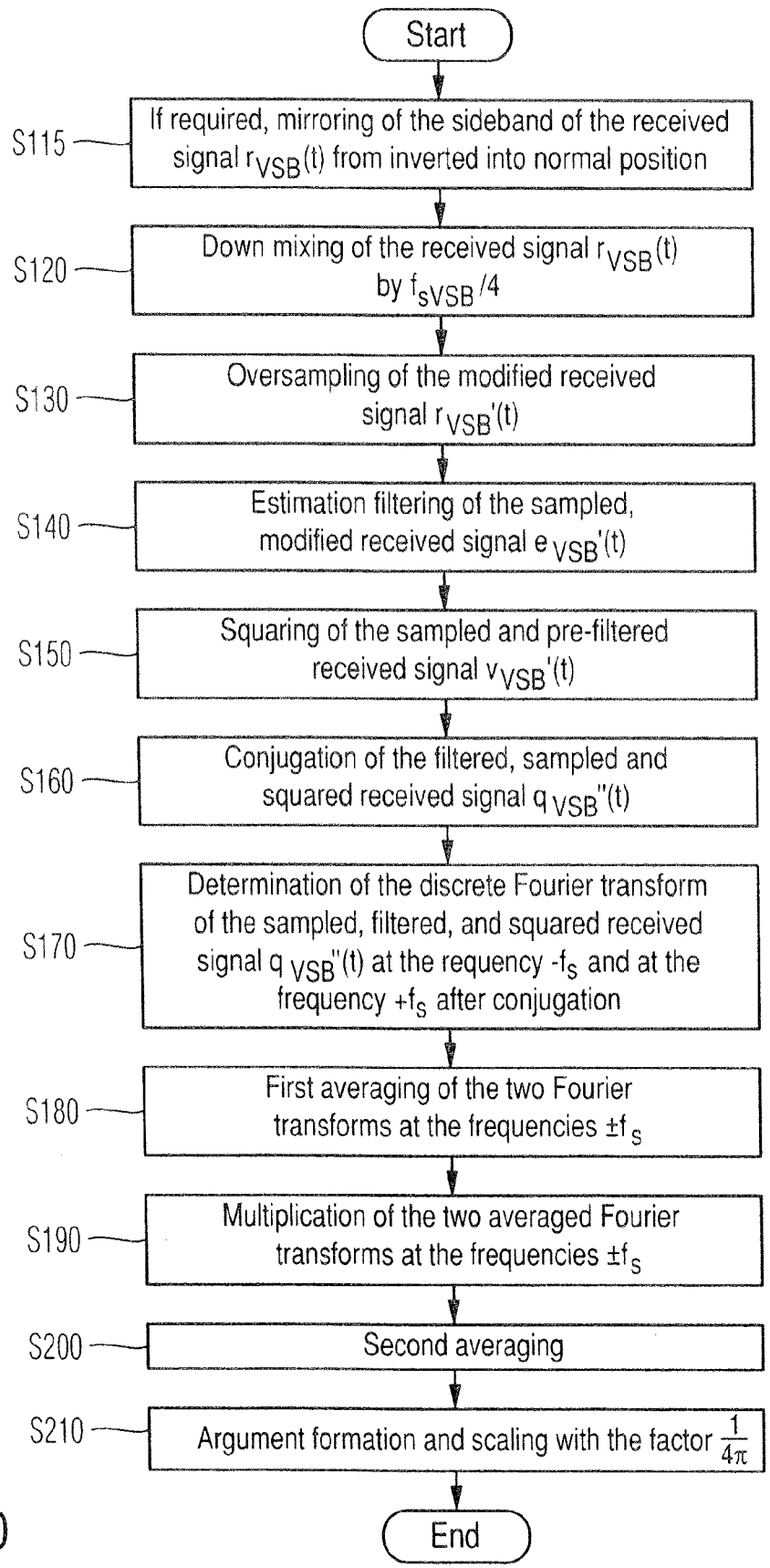
FIG. 10 shows a flow chart of a second embodiment of the method according to the invention for clock synchronisation with a VSB signal.

The flow chart for the associated method according to the invention for clock synchronisation with a VSB signal is presented in FIG. 10. As shown in FIG. 10, the procedural stages S115 to S150 and S190 to S210 of the second embodiment are identical to the corresponding procedural stages S10 to S50 and S90 to S110 of the first embodiment shown in FIG. 7 and will not be explained in any further detail below.

In procedural stage S160 of the second embodiment of the method according to the invention, the filtered, sampled and squared received signal $q_{VSB}''(t)$ is conjugated in a conjugator 21.

In the following procedural stage S170, the Fourier transforms $Q_{VSB}''^*(f_S)$ at the frequency $f_S$ and $Q_{VSB}''(-f_S)$ at the frequency $-f_S$ are calculated respectively in a first and second discrete Fourier transformer 19 and 20 from the conjugated, filtered, sampled and squared received signal $q_{VSB}''(t)$ and the un-conjugated, filtered, sampled and squared received signal $q_{VSB}''(t)$.

In the next procedural stage S180, the first averaging of the two discrete Fourier transforms $Q_{VSB}''^*(f_s)$ at the frequency $f_s$ and $Q_{VSB}''(-f_s)$ at the frequency $-f_s$ takes place according to equation (31) in a first averaging filter 17A and 17B respectively.

The multiplication of the averaged, discrete Fourier transforms $Q_{VSB}''^*(f_s)$ at the frequency $f_s$ and $Q_{VSB}''(-f_s)$ at the frequency $-f_s$ take place in procedural stage S190 exactly as in the first embodiment of the method according to the invention. Reference is therefore made to the design of the first embodiment presented above for the further explanation of the remaining procedural stages.

The invention is not restricted to the embodiments presented here. In particular, in addition to 2VSB signals, VSB signals with higher-value symbol alphabet—for example, 8VSB signals and 16VSB signals—are also covered by the invention. The invention also covers VSB signals without a pilot carrier.

The invention claimed is:

1. A method comprising:
   estimating a timing offset between a received signal and a transmitted signal using maximum-likelihood estimation, wherein the step of estimating includes,
   performing estimation filtering on the received signal dependent upon a transmission characteristic to obtain a filtered signal,
   utilizing a nonlinear signal-processing function on the filtered signal to obtain a nonlinear signal-processed signal, and
   providing an averaging filtering on the nonlinear signal-processed signal,
   wherein the received signal is a modified vestigial-sideband-modulated signal and the nonlinear signal-processing function maintains alternating components in a spectrum of a filtered vestigial-sideband-modulated signal.

2. A method according to claim 1, wherein the modified vestigial-sideband-modulated signal is obtained by down mixing a vestigial-sideband-modulated signal by one quarter of a symbol frequency of the vestigial-sideband-modulated signal.

3. A method according to claim 1, wherein a symbol duration of the modified vestigial-sideband-modulated signal is half of a symbol duration of the signal.

4. A method according to claim 1, wherein the nonlinear signal-processing function is a squaring without modulus formation.

5. A method according to claim 4, wherein the squaring without modulus formation superimposes a squared real and imaginary component of the filtered vestigial-sideband-modulated signal having maintained the alternating components in the spectrum of the filtered vestigial-sideband-modulated signal.

6. A method according to claim 1, wherein a Fourier transform of a pre-filtered and squared vestigial-sideband-modulated signal is determined respectively at positive and negative symbol frequencies.

7. A method according to claim 6, further comprising:
   conjugating, at the positive symbol frequency, the Fourier transform of the pre-filtered and squared vestigial-sideband-modulated signal; and
   multiplying a result of the conjugating by the Fourier transform of the pre-filtered and squared vestigial-sideband-modulated signal at the negative symbol frequency.

8. A method according to claim 1, wherein the averaging filtering includes a first averaging filtering and a second averaging filtering.

9. A method according to claim 8, wherein a bandwidth of the first averaging filtering is increased until spectral lines of the filtered and squared vestigial-sideband-modulated signal displaced respectively by a frequency offset of a carrier frequency relative to the positive and negative symbol frequencies, are disposed within a throughput range of the first averaging filtering.

10. A method according to claim 8, wherein the first averaging filtering is implemented before determining two Fourier transforms of a pre-filtered and squared vestigial-sideband-modulated signal taken respectively at a positive symbol frequency and at a negative symbol frequency.

11. A method according to claim 8, wherein the first averaging filtering is implemented after determining two Fourier transforms of a pre-filtered and squared vestigial-sideband-modulated signal respectively taken at a positive symbol frequency and at a negative symbol frequency.

12. A method according to claim 9, wherein a duration of an impulse response of the second averaging filtering is increased, until a duration of an impulse response of the first averaging filtering, reduced by the increased bandwidth, in combination with the duration of the impulse response of the second averaging filtering, reaches a total duration for smoothing interference superimposed on the pre-filtered and squared vestigial-sideband-modulated signal.

13. A method according to claim 7, wherein the averaging filtering includes a first averaging filtering and a second averaging filtering, and the second averaging filtering is implemented after multiplying the result.

14. A method according to claim 2, wherein in cases of an inverted position of a sideband of the vestigial-sideband-modulated signal, a mirroring of the sideband from the inverted position to a non-inverted position is implemented before down mixing the vestigial-sideband-modulated signal.

15. A method according to claim 2, wherein the vestigial-sideband-modulated signal is a vestigial-sideband-modulated signal including two real symbols, four real symbols, eight real symbols, 16 real symbols or M real symbols, wherein M is a positive integer.

16. An apparatus comprising:
an estimator configured to estimate a timing offset between a received signal and a transmitted signal using a maximum-likelihood estimation, wherein the estimator includes,
an estimation filter configured to perform an estimation filtering on the received signal dependent upon a transmission characteristic,
a nonlinear signal-processing unit operatively connected to an output of the estimation filter, and
an averaging filter operatively connected to an output of the nonlinear signal-processing unit,
wherein the received signal is a modified vestigial-sideband-modulated signal and the nonlinear signal-processing unit is a squaring unit without a modulus former.

17. An apparatus according to claim 16, further comprising:
a down mixer; and
a subsequent sampling and holding element,
wherein the down mixer and the subsequent sampling and holding element are connected upstream of the estimation filter, and
wherein the down mixer and the subsequent sampling and holding element are configured to generate the modified vestigial-sideband-modulated signal from a vestigial-sideband-modulated signal.

18. An apparatus according to claim 16, wherein the averaging filter includes a first averaging filter and a second averaging filter connected downstream of the estimation filter.

19. An apparatus according to claim 18, further comprising:
a first discrete Fourier transformer; and
a second discrete Fourier transformer,
wherein the first and second discrete Fourier transformers are respectively connected between the squaring unit and the second averaging filter, and
wherein the first and second discrete Fourier transformers are configured to implement Fourier transformations at a positive symbol frequency and at a negative symbol frequency, respectively.

20. An apparatus according to claim 19, further comprising:
a conjugator configured to conjugate Fourier transformations at positive symbol frequencies,
wherein the conjugator is either connected upstream or downstream of the first discrete Fourier transformer.

21. An apparatus according to claim 19, wherein the first averaging filter is connected upstream of the first discrete Fourier transformer and the second discrete Fourier transformer.

22. An apparatus according to claim 19, wherein the first averaging filter is connected downstream of the first discrete Fourier transformer and the second discrete Fourier transformer, respectively.

23. An apparatus according to claim 21, further comprising:
a multiplier connected downstream of the first discrete Fourier transformer and the second discrete Fourier transformer or connected downstream of the first averaging filter and the second averaging filter,
wherein the multiplier is configured to multiply a conjugated Fourier transform of a pre-filtered and squared vestigial-sideband-modulated signal, and
wherein the conjugated Fourier transform is taken at a positive symbol frequency of a Fourier transform of the pre-filtered and squared vestigial-sideband-modulated signal taken at a negative symbol frequency.

24. An apparatus according to claim 17, further comprising:
a unit configured for sideband mirroring connected upstream of the down mixer.

25. A digital storage medium including one or more electronically-readable instructions for causing one or more processors coupled to the digital storage medium to carry out the method of claim 1.

26. A computer readable medium including a computer program, wherein the computer program embodies code for implementing the method of claim 1 on a computer or by a processor.

* * * * *